United States Patent [19]

Phuvan

[11] Patent Number: 5,289,304
[45] Date of Patent: Feb. 22, 1994

[54] VARIABLE RATE TRANSFER OF OPTICAL INFORMATION

[75] Inventor: Sonlinh Phuvan, Silver Spring, Md.

[73] Assignee: The United States of America as represented by the Secretary of the Navy, Washington, D.C.

[21] Appl. No.: 46,254

[22] Filed: Mar. 24, 1993

[51] Int. Cl.⁵ .......................... H04J 14/08; G02F 1/00
[52] U.S. Cl. ..................... 359/140; 359/107; 359/109; 364/713
[58] Field of Search ............... 359/109, 117, 129, 131, 359/140, 107; 364/713

[56] References Cited

U.S. PATENT DOCUMENTS

| 4,495,656 | 1/1985 | Shaw et al. | 359/140 |
| 4,697,247 | 9/1987 | Grinberg et al. | 364/713 |
| 4,918,635 | 4/1990 | Li et al. | 359/107 |
| 5,050,117 | 9/1991 | McAulay | 364/713 |
| 5,202,845 | 4/1993 | Andonovic et al. | 364/713 |

*Primary Examiner*—Richard E. Chilcot, Jr.
*Assistant Examiner*—Kinfe-Michael Negash
*Attorney, Agent, or Firm*—Jacob Shuster

[57] ABSTRACT

Two-dimensional optical data is transferred at a variable rate through an optical delay module formed by spatial light modulators of the ferroelectric liquid crystal type interconnected in series for data transmission by a beam splitter through which laser radiation is introduced. Operation of the light modulators is controllably interrelated to control the variable delayed transfer rate of the module.

14 Claims, 3 Drawing Sheets

VARIABLE RATE TRANSFER OF OPTICAL INFORMATION

BACKGROUND OF THE INVENTION

This invention relates in general to optical signal processing, including the use of two-dimensional optical delay lines through which transfer rate control of optical data is exercised.

Pattern recognition systems involving identification and classification of input data are presently utilized for a wide variety of purposes including but not limited to product line inspection, computer text scanning, robotics, medical diagnostics, fingerprint identification, product code scanners in supermarkets, airport security and character recognition. There is also significant military interest in pattern recognition for autonomous identification of enemy targets through a smart weapon system where speed and accuracy requirements are high. Such requirements can be met by the high throughput realized from the parallelism inherent in optical signal processing systems.

There are several classes of pattern classification techniques, including feature extractions, correlation filters or template matching, and matched filtering. In the feature extraction technique, feature characteristics of the input data to be classified are a priori extracted from the input data. Those extracted features are then used for feature location in subsequent input data for classification purposes. An inherent problem with this technique is in the selection of the characteristic features, and in potential loss of significant information.

The correlation filter technique is used in pattern classification by finding the closest match between a correlation filter specific to a given class. The closest match identifies the class to which the input data belongs. The latter technique is not very sensitive and cannot discriminate between highly correlated classes.

The match filter is used in a pattern classification technique in a manner similar to that of the correlation filters. The input pattern is compared with a number of stored filters or patterns and the closest match is considered to be the class to which the input data belongs. While the matched filter technique provides the maximum possible signal to noise ratio for pattern detection in white additive noise, its performance will degrade significantly in non-white additive noise.

The foregoing classification techniques are highly sensitive to change of the input data in scale and rotation. A change of 5% in the scale of the image, for example, will reduce detection probability by at least 50% while a change in rotation of 5% has the same effect. Three methods are used to compensate for the scale and rotation invariance problem in pattern recognition. One of the methods is to create smart filters in which the input data is mathematically mapped into a scale and rotation invariant construct. This method is computationaly intensive and suffers from noise and distortion sensitivity. Another method is to use many filters, each filter differing in scale and/or rotation, and matching the input data with all possible variations of rotation and scale. The latter method requires a large amount of filters, and slows the classification rate significantly since the filters have to be mechanically changed or electronically updated through a slow electronic interface. Yet another method involves storing multiple patterns of the same class with variation in scale and rotation on a single filter. Such technique has the disadvantage that as the number of patterns stored on a single filter increases, the performance of the filter degrades rapidly.

A possible solution to the foregoing problems is to use an optical ring. However, with use of the optical ring the transfer rate is uncontrolled since data is transferred within the ring at the speed of light. No existing electronic or optical/electronic hybrid systems or devices can interface at such a high data transfer rate. Another significant problem arises because the optical gain is significantly less than one while the optical intensity decreases rapidly with each iteration within the optical ring until all data is, for all intent and purpose, lost.

The foregoing problems and proposed solutions are not limited to scale and rotation for optical pattern classification but also to any optical processing system implementing any type of iterative process, including but not limited to, optical associative memory, artificial neural networks, and optical wavelet transforms.

It is therefore an important object of the present invention to introduce a two-dimension optical ring with variable transfer rate and unity gain, thus resolving major problems of the optical ring and allow practical implementations of optical iterative processing in any optical signal processing system requiring iterative processing such as, scale and rotation invariant pattern classification and including optical associative memories, optical artificial neural network and optical wavelet processing.

SUMMARY OF THE INVENTION

In accordance with the present invention, a variable optical delay module is introduced within an optical ring to provide control of the data transfer rate and optical unity gain. Two optically addressed spatial light modulators of the ferroelectric liquid crystal based type, according to one embodiment, are utilized in the optical delay module to avoid corruption of the data within the optical ring. The data is stored in one of the spatial light modulators during data transfer to the other spatial light modulator so that neither modulator would be reading from itself to overwrite and corrupt its data. An image input impinges on one spatial light modulator producing a charge distribution within the spatial modulators which matches the local intensity of the image input. This charge distribution switches the orientation of the ferroelectric liquid crystal if it exceeds a selected threshold charge magnitude. This charge distribution can be held or stored within the spatial modulator for selected time periods, thus providing an optical delay within the optical ring. Since a separate beam is used to write and read the spatial light modulator, an optical gain of unity is obtained without attenuation of optical data intensity while an infinite number of iterations is made possible.

For scale invariant pattern recognition purposes, a set of zoom lens is placed within the optical ring so that as the optical image rotates within the ring, each iteration produces either a magnification or reduction of the image. Such image is then transferred out of the ring for matching with a reference image. Each transfer is a scaled image of the previous image. For rotation of invariant classification, the zoom lens set is replaced by a Dove prism in conjunction with a prism doing an x-y flip, thus producing image rotation. The image rotation angle is twice the tilt angle of the Dove prism. For both scale and rotation invariance, two optical rings can be used together, one for rotation, and the other ring for scale. Another technique involves introducing within a single optical ring both a zoom lens set and a set of Dove and tilt prism.

BRIEF DESCRIPTION OF DRAWING FIGURES

Other objects, advantages and novel features of the invention will become apparent from the following detailed description of the invention when considered in conjunction with the accompanying drawing wherein.

DETAILED DESCRIPTION OF PREFERRED EMBODIMENTS

Figure 1:
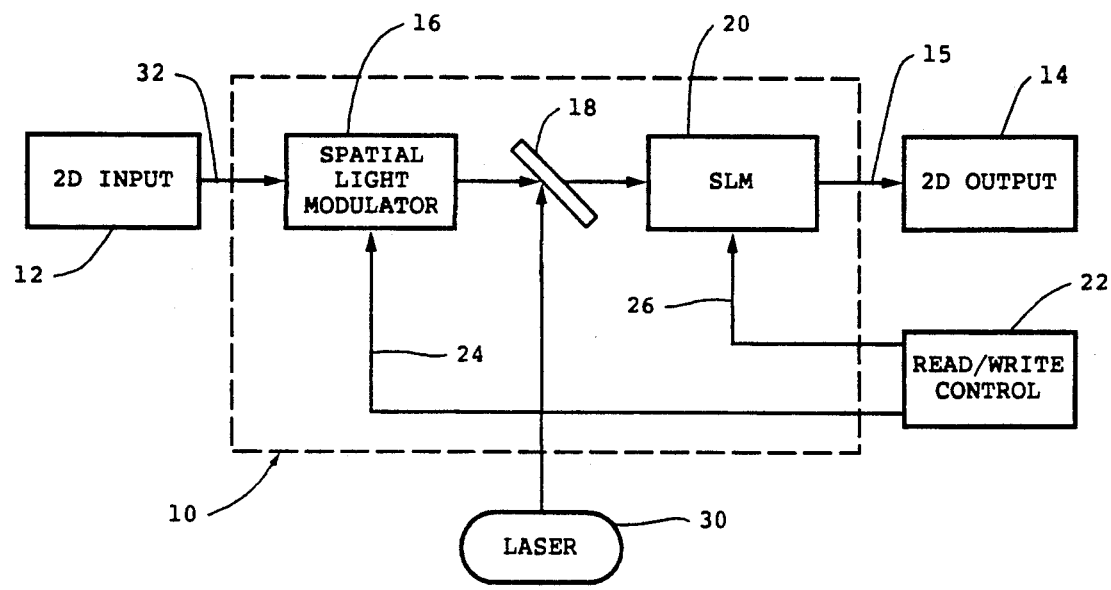
FIG. 1 is a block diagram of an optical data transfer module arranged in accordance with the present invention.

Referring now to the drawing in detail, FIG. 1 diagrammatically illustrates a data transfer module, generally referred to by reference numeral 10, through which transfer of optical data is controllably delayed from a two dimensional input source 12 to some data output device 14 at a variable transfer rate. The two dimensional image data from input source 12 is initially applied to and temporarily stored within an optically addressed spatial light modulator 16 of the optical delay module 10. Such input data after a predetermined time period is transferred from modulator 16 through a beam splitter 18 to a second optically addressed spatial light modulator 20 from which it is then sequentially transferred into the output device 14 through an optical data processing stream 15. Each of the modulators 16 and 20 has a write operating state and a read or storage operating state. Such operating states for each of the modulators is electrically determined by a read/write control 22 through electrical control lines 24 and 26 as diagrammed in FIG. 1. Control 22 furthermore limits operation of the respective modulators 16 and 20 to different states. Thus, when one modulator is in the read or storage state the other modulator is in the write state.

As also diagrammed in FIG. 1, two dimensional input image data is transferred between the modulators 16 and 20 under control of optical radiation reflected from and passing through the beam splitter 18, such radiation originating as a read beam 28 from a source 30 of laser radiation. The spatial light modulators 16 and 20 pursuant to the present invention spatially modulate polarization of the read beam 28 as a function of an intensity-varying input write beam 32 from source 12.

Figure 2:
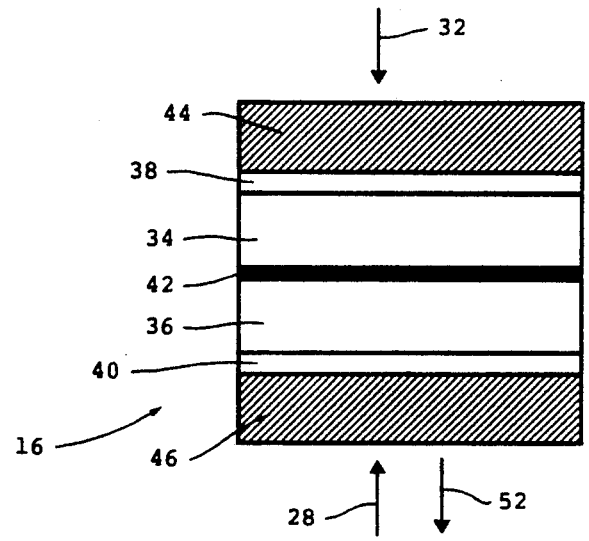
FIG. 2 is a side view of a spatial light modulator utilized in the module depicted in FIG. 1.

As shown in FIG. 2, the modulator 16 is composed of an amorphous silicon, photodiode light-sensing layer 34 and a ferroelectric liquid crystal light-modulating layer 36 sandwiched between two layers 38 and 40 of transparent conducting oxide. It is through the layers 38 and 40 that a voltage potential is produced across the modulator. In addition, a dielectric mirror 42 is placed between the layers 34 and 36 to increase the reflectivity of the light of read beam 28. The active areas of the modulator according to one embodiment is approximately one inch in diameter with a resolution of 33 lp/mm to achieve frame rates of up to 15 kHz. Light from the write and read beams 32 and 28 are applied to layers 38 and 40 through glass covers 44 and 46. Spatial light modulators of the foregoing type are manufactured, for example, by Displaytech Corporation of Boulder, Colo.

The layer 34 is an ideal Si:H photosensor switch to address ferroelectric liquid crystals It has the properties of high switching speed, high resolution, good impedance matching with liquid crystals, low write light intensities, linear response, a low capacitance, and a broadband absorption spectrum. The charges generated from the photosensor layer 34 switch on the corresponding molecules in layer 36 with the application of the write beam 32. The ferroelectric liquid crystal layer 36 provides a large electrooptic effect and fast response time from low applied voltages to modulate the read beam 28 reflecting off the modulator. In addition, the layer 36 exhibits a built-in macroscopic polarization as a result of its molecular order as distinguished from the slower nematic liquid crystal commonly used in TV displays. Further, the ferroelectric crystal layer 36 has several phases that vary with temperature. At temperatures above 90° C. degrees, the material exhibits nematic characteristics, where the molecules have orientational order but lack positional order. In this phase, the molecules begin to act like liquid crystals. Below 85° C. the ferroelectric liquid crystal enters the smectic phase, where the liquid crystals have order in both their orientation and position as well as a macroscopic polarization. In the smectic A phase, which occurs between 80° C. and 85° C., the molecules are colinear with the layer normal. Below 65° C., the molecules are in the smectic C phase. The smectic-C phase is distinguished from the smectic-A phase by a molecular tilt with respect to the layer normal. With the presence of chirality in the smectic-C phase, there is zero macroscopic polarization.

In the smectic-C phase of layer 36, the surface interactions suppress all stable energy states except for two, making the modulator a bistable device. These states occur in the plane of the modulator cell to accommodate macroscopic ferroelectricity, allowing a bulk dipole moment orthogonal to the tilt direction and parallel to the modulator layers. The permanent dipole moment allows first-order field-assisted switching at a response speed of several magnitudes above that of nematic liquid crystals. With the application of a positive or negative bias, the modulator assumes a state with a tilt angle (a) of $\pm 45°$. When the modulator is switched between states, the resulting total optic axis change ($2\alpha$) is 90° causing the polarization of the read light in beam 28 to be modulated.

Figure 3:
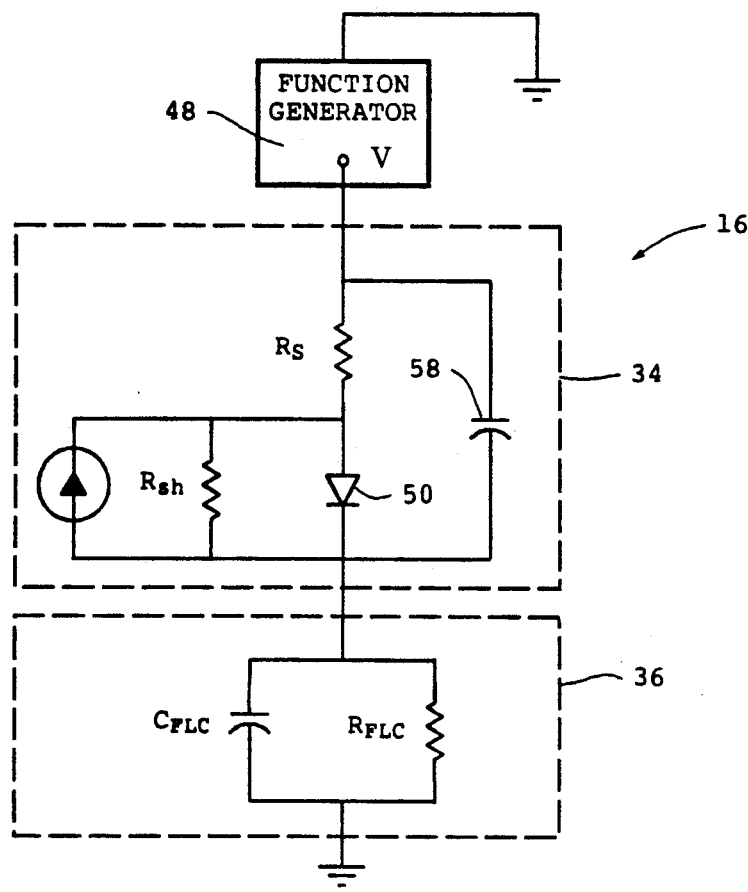
FIG. 3 is an equivalent circuit diagram corresponding to each of the spatial light modulators depicted in FIGS. 1 and 2.
Figure 4:
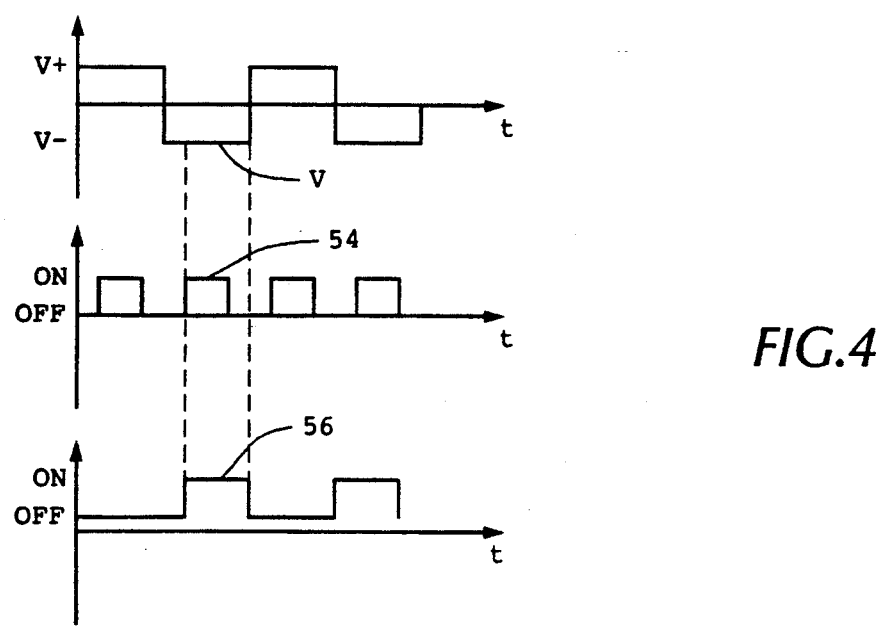
FIG. 4 is a graphical signal waveform diagram corresponding to operation of each of the spatial light modulators depicted in FIGS. 2 and 3.

Each of the spatial light modulators is subjected to a square wave voltage with a positive offset by the positive output electrically applied to the layer 34 while negative ground is connected to the layer 36 as diagrammed by the equivalent circuit depicted in FIG. 3 including a function generator 48 from which the square wave voltage is shown to be applied to modulator 16. Under a positive applied voltage (V), a p-i-n photodiode 50 formed in layer 34 is forward-biased and all the applied voltage drops across the layer 36 independent of any write light illumination in beam 32. As a result, all the molecules of layer 36 orient to one of the angular states called the off-state. This erases any image that may be stored by spatially-varying phase orientations of the layer molecules. Under a negative bias, the unilluminated photodiode 50 blocks. As a result, all the voltage drops across it. The modulator thus becomes light sensitive and switches to a state where read/write operations are possible. The write beam 32 with a spatially-varying intensity depicting an image incident upon the light-sensitive layer 34 of the modulator causes a photocurrent to flow which applies a voltage to layer 36 and turns it on in areas corresponding to the image. A polarized read beam 52 reflected off the dielectric mirror at the interface 42 between layers 34 and 36 passes through layer 36 twice and gains a polarized distribution based on the replicated image. Intensity modulation can be acquired by passing the reflected read beam 52 through a polarization analyzer. FIG. 4 shows the time relationships between the voltage (V) applied to the modulator, write light intensity 54 of the beam 32, and reflected read light intensity 56 of beam 52 during modulator operation.

In the equivalent circuit of each modulator as shown in FIG. 3, $R_s$ is the resistance which includes the amorphous silicon bulk resistance and the sheet resistance while $R_{sh}$ is the shunt resistance to the leakage current. The capacitance of the amorphous silicon capacitor 58 includes the p-i-n junction depletion capacitance as well as the geometric capacitance. $R_{FLC}$ and $C_{FLC}$ are the resistance and capacitance, respectively, of the ferroelectric liquid crystal layer 36. In such equivalent circuit, it is assumed that the reflector layer 42 is conducting or nonexistant. For an insulating reflector, an additional capacitance must be added between the photodiode and the liquid crystal.

Figure 5:
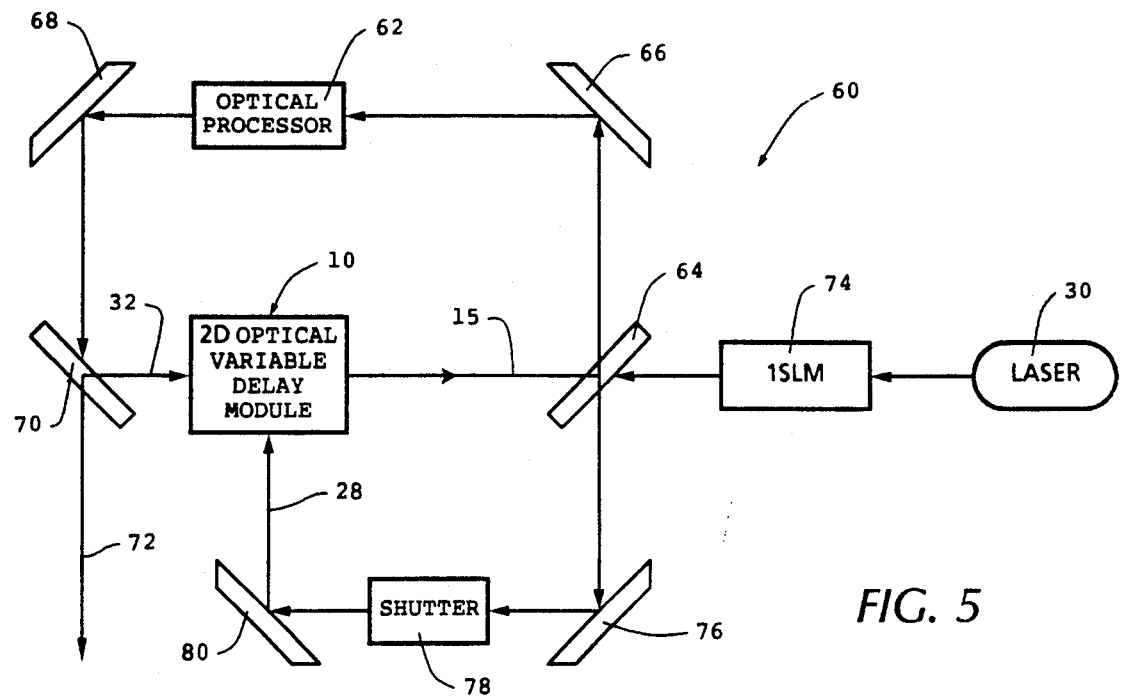
FIG. 5 is a block diagram of an optical ring architecture within which the data transfer module of FIG. 1 is utilized in accordance with one embodiment of the invention.

In accordance with one embodiment of the invention, the 2-D optical variable delay module 10 hereinbefore described is utilized in an optical ring architecture, generally referred to by reference numeral 60 in FIG. 5, in order to perform iterative operations at a variable and controllable rate. The output beam 15 from the module 10 is fed to an optical data processor 62 through a beam splitter 64 and reflecting mirror 66 and from which optical image data is transmitted by mirror 68 and beam splitter 70 into an output beam 72 for transfer to some subsequent processor. The other part of the beam transmitted by beam splitter 70 is fed back to the data transfer module 10 as the input beam 32 for controlled delay and retransfer to the optical processor.

The beam splitter 64 in addition to receiving the modulated output beam 15 from module 10, also initially receives an input modulated beam from a spatial light modulator 74 to which laser radiation is fed from the aforementioned laser source 30. The beam splitter 64 accordingly directs a laser control beam during an initial input phase from laser source 30, modified by modulator 74, to mirror 76 establishing a coupling portion of the optical ring system 60 that is subsequently inactivated. The reflected beam from mirror 76 passes along the circuit path of such coupling portion through a shutter 78 to mirror 80 from which the beam 28 is derived as the laser radiation input to the module 10. The module 10 thereby acts to delay and control the rate of passage of optical image data through the optical ring system 60.

With continued reference to FIG. 5, the optical processor 62 according to certain embodiments of the invention may be utilized to effect cyclic rotation or scaling of the 2-D optical image being transferred through the optical ring system 60 at a rate determined by the module 10. The use of a Dove prism for example, as the optical processor provides the optical ring system 60 with the capability of matching a variable image rotation rate to a subsequent optical processor to which the output image beam 72 is transferred.

To enter an image into the optical ring system 60, the laser 30 of a randomly-polarized He-Ne type fires to read data stored in modulator 74 and produce input beams reflected by beam splitter 64 to mirrors 66 and 76. Shutter 78 controls one of the reflected beams further reflected off mirror 80 into the module 10 to vary the image transfer rate by means of its output beam 15 impinging on the input beam splitter 64. The other of the reflected input beams from beam splitter 64 is further reflected by mirror 66 for image rotation, where a Dove prism is utilized, before reflection by mirror 68 into the output beam 72 through the beam splitter 70. The beam splitter 70 reflects such output beam into the module 10 as input beam 32 through which the variable image transfer rate is controlled.

Figure 6:
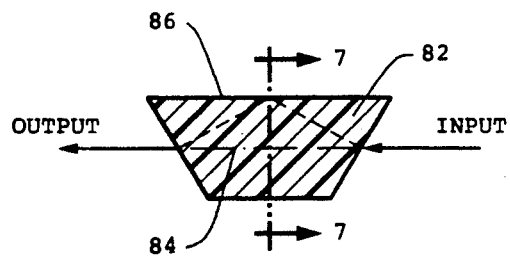
FIG. 6 is a side section view through a Dove prism utilized for optical signal processing in the ring architecture depicted in FIG. 5.
Figure 7:
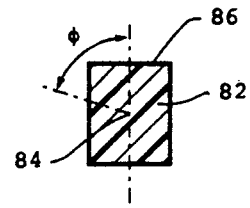
FIG. 7 is a transverse section view taken substantially through a plane indicated by section line 7—7 in FIG. 6.

As shown in FIGS. 6 and 7, a Dove prism 82, hereinbefore referred to at the location of optical processor 62 in the optical ring system 60, undergoes cyclic rotation by an angle $\phi$ relative to the the system optics, so that an image passing through the prism along its rotational axis 84 is vertically flipped or rotated by an angle of $2\phi$ and emerges inverted in a direction perpendicular to the prism hypotenuse face 86. Such image rotation by the prism 82 varies the change in angular orientation of an image transferred through the optical ring system 60 so as to provide the rotation rate matching capability hereinbefore referred to.

Numerous other modifications and variations of the present invention are possible in light of the foregoing teachings. It is therefore to be understood that within the scope of the appended claims the invention may be practiced otherwise than as specifically described.

What is claimed is:

1. In a data processing system having a data source and a signal processing device through which optical information derived from the data source is processed at a predetermined transfer rate; data transfer means operatively connected between the data source and the signal processing device for delayed transfer of the optical information from the data source and control means connected to said data transfer means for controllably varying said delayed transfer of the optical information to the signal processing means to substantially match the predetermined transfer rate.

2. The combination of claim 1 wherein said data transfer means includes a pair of spatial light modulators respectively connected to said data source and the signal processing device and optically addressed by the control means, a source of laser radiation and beam splitter means responsive to the laser radiation for optically interconnecting the spatial light modulators to effect said delayed transfer of the optical information therebetween.

3. The combination of claim 2 wherein each of said spatial light modulators includes an amorphous silicon, photodiode layer, a ferroelectric liquid crystal light-modulating layer and a dielectric mirror between said layers.

4. The combination of claim 3 wherein said data processing system further includes an optical ring conducting the optical information repeatedly through the data transfer means at said predetermined transfer rate and coupling means operatively connecting the source of laser radiation to the optical ring for controlling operation of the data transfer means through the beam splitter means thereof.

5. The combination of claim 4 wherein said coupling means includes a shutter through which the laser radiation is conducted to the beam splitter means.

6. The combination of claim 5 wherein said optical ring includes lens means through which the optical information is conducted for cyclic processing thereof.

7. The combination of claim 6 wherein said lens means is a Dove prism within which said cyclic processing causes periodic angular reorientation of the optical information.

8. The combination of claim 1 wherein said data processing system further includes an optical ring conducting the optical information repeatedly through the data transfer means at said predetermined transfer rate and coupling means operatively connecting the source of laser radiation to the optical ring for controlling operation of the data transfer means through the beam splitter means thereof.

9. The combination of claim 8 wherein said optical ring includes lens means through which the optical information is conducted for cyclic processing thereof.

10. The combination of claim 9 wherein said lens means is a Dove prism within which said cyclic processing causes periodic angular reorientation of the optical information.

11. In a data processing system having a data source and a signal processing device through which optical information derived from the data source is processed, a source of laser radiation and data transfer means for delaying transfer of the optical information to the signal processing device at a variable transfer rate including: a pair of spatial light modulators respectively connected to said data source and the signal processing device and a beam splitter optically coupling the spatial light modulators to each other under control of said laser radiation.

12. The combination of claim 11 wherein each of said spatial light modulators includes an amorphous silicon, photodiode layer, a ferroelectric liquid crystal light-modulating layer and a dielectric mirror between said layers.

13. In a data processing system having a data source, a signal processing device and optical ring means for transfer of optical information between the data source and the signal processing device, said optical ring means including optical delay means for varying said transfer of the optical information, shutter means for cylically controlling said transfer of the optical information and means for optically processing the optical information during said transfer thereof.

14. The combination of claim 13 wherein said means for optically processing comprises a Dove prism through which the optical information is angularly reorientated.

* * * * *